(12) United States Patent
Klemm et al.

(10) Patent No.: US 10,659,501 B2
(45) Date of Patent: May 19, 2020

(54) SYSTEM AND METHOD FOR EFFICIENT PORT AND BANDWIDTH UTILIZATION IN SETTING UP COMMUNICATION SESSIONS

(71) Applicant: Avaya Inc., Santa Clara, CA (US)

(72) Inventors: Reinhard Klemm, Basking Ridge, NJ (US); Parameshwaran Krishnan, Basking Ridge, NJ (US); Navjot Singh, Somerset, NJ (US)

(73) Assignee: Avaya Inc., Santa Clara, CA (US)

( * ) Notice: Subject to any disclaimer, the term of this patent is extended or adjusted under 35 U.S.C. 154(b) by 1037 days.

(21) Appl. No.: 14/319,107

(22) Filed: Jun. 30, 2014

(65) Prior Publication Data
US 2015/0381674 A1 Dec. 31, 2015

(51) Int. Cl.
H04L 29/06 (2006.01)
G06F 3/0482 (2013.01)
H04L 29/08 (2006.01)
H04M 3/493 (2006.01)
H04M 3/51 (2006.01)
G06F 3/16 (2006.01)

(52) U.S. Cl.
CPC ........ H04L 65/4053 (2013.01); G06F 3/0482 (2013.01); H04L 67/141 (2013.01); H04M 3/493 (2013.01); H04M 3/5166 (2013.01); G06F 3/167 (2013.01)

(58) Field of Classification Search
CPC ... G06F 3/0482; H04L 65/403; H04L 67/141; H04L 67/42
See application file for complete search history.

(56) References Cited

U.S. PATENT DOCUMENTS

| | | | | |
|---|---|---|---|---|
| 8,081,749 B1 * | 12/2011 | Shaffer | ................. | H04M 3/523 379/215.01 |
| 8,989,369 B1 * | 3/2015 | Asghari | ............. | H04M 3/5133 379/265.01 |
| 9,628,623 B2 * | 4/2017 | Vymenets | ........... | H04M 3/5183 |
| 2006/0018443 A1 * | 1/2006 | Knott | .................... | H04M 3/493 379/88.16 |
| 2008/0226042 A1 * | 9/2008 | Singh | .................... | H04M 1/247 379/88.04 |
| 2012/0008755 A1 * | 1/2012 | Mittal | ................. | H04M 3/4931 379/93.01 |

(Continued)

Primary Examiner — Chris Parry
Assistant Examiner — Adam A Cooney

(57) ABSTRACT

Techniques for efficiently allocating ports and bandwidth in a communication system configured to establish interactive, real time communication sessions between endpoints are described. Requests are received at a server, from a requester endpoint device, to initiate an interactive, real time communication voice and/or video session requiring access to an interactive session resource. In an embodiment, the communication system is a contact center and the interactive session resource is an available contact center agent. Pending availability of the interactive session resource, a requester is assigned a place in a queue or otherwise scheduled to receive access to the interactive session resource. In the meantime, a data channel is established between the server and the requester's endpoint device. Resources, which can include an executable program and/or information operative to enable the endpoint device to emulate an active on-hold voice connection period, are downloaded to the endpoint device.

18 Claims, 10 Drawing Sheets

(56) References Cited

U.S. PATENT DOCUMENTS

| | | | | |
|---|---|---|---|---|
| 2014/0126713 A1* | 5/2014 | Ristock | ............... | H04M 3/5231 379/265.09 |
| 2014/0161249 A1* | 6/2014 | Tolksdorf | .............. | H04M 3/523 379/266.1 |
| 2015/0169336 A1* | 6/2015 | Harper | .................... | G10L 15/22 715/706 |
| 2015/0237196 A1* | 8/2015 | Song | ...................... | G06Q 30/00 455/414.1 |

* cited by examiner

SYSTEM AND METHOD FOR EFFICIENT PORT AND BANDWIDTH UTILIZATION IN SETTING UP COMMUNICATION SESSIONS

BACKGROUND OF THE INVENTION

Field of the Invention

Embodiments of the disclosure relates generally to establishing and maintaining communication sessions between two or more endpoints.

Description of the Related Art

In communication systems configured to establish interactive communication sessions between two or more persons, it is not uncommon for one, some or all of the persons to be placed on "hold" pending the availability of an interactive communication session resource. By way of illustrative example, in a contact center context, a contacting party (e.g. a customer) may use a regular telephone, a smartphone, or a mobile or desktop computer terminal (equipped with a microphone, speakers, user interface and, optionally, a camera) to request an interactive communication session with an agent. In this context, the agent is a requisite interactive communication session resource. If no agent is available to speak with or conduct a video conference call with the contacting party, the contacting party is placed in a queue until an agent does become available.

Web Real-Time Communications (WebRTC) are the result of an ongoing effort to develop industry standards for integrating real-time communications functionality into web clients, such as web browsers, to enable direct interaction with other web clients. This real-time communications functionality is accessible by web developers via standard markup tags, such as those provided by version 5 of the Hypertext Markup Language (HTML5), and client-side scripting Application Programming Interfaces (APIs) such as JavaScript APIs. More information regarding WebRTC may be found in "WebRTC: APIs and RTCWEB Protocols of the HTML5 Real-Time Web," by Alan B. Johnston and Daniel C. Burnett (2012 Digital Codex LLC), which is incorporated in its entirety herein by reference.

WebRTC provides built-in capabilities for establishing real-time video, audio, and/or data streams in both point-to-point interactive sessions, as well as multi-party interactive sessions. WebRTC standards have been jointly developed by the World Wide Web Consortium (W3C) and the Internet Engineering Task Force (IETF). Information on the current state of WebRTC standards can be found at, e.g., http://www.w3c.org and http://www/ietf.org. An example of a communication system configured to employ WebRTC as part of an interactive communication session between two or more parties is the Contact Center.

In contact center implementations of WebRTC, interactive communication session resources (ports, bandwidth reservations, etc.) are frequently negotiated and set up between a contact center server and the endpoint communication terminal used by a contacting party. At some point in the session flow, WebRTC is used to establish an interactive communication session between the contacting party and a contact center agent. The WebRTC ports and connections are established well in advance of the assignment of an agent, however, because a suitable contact center agent is typically not available right away at the time of contact. While the contacting party is waiting for a contact center agent, the contact center system may stream continuous hold music punctuated by periodic estimated wait time updates over the established communication session, as well as queries for information to be supplied by the contacting party, and various other announcements to be audibly reproduced by contacting party's endpoint device.

The thoughtful use of interactive session connections, WebRTC or otherwise, to set up and maintain an interactive conversation with one or more clients, customers, potential customers, investors, and others, can substantially enrich and enhance the experience for all parties concerned. However, as will be appreciated by the contact center "customer on-hold" example discussed above, the resources which must be allocated in order to establish a truly "interactive" communication session between endpoints may go unutilized for substantial periods of time while one of the endpoints is inactive. Since a network administrator must provision a network with sufficient resources to accommodate periods of peak demand, higher costs may be incurred for equipment, software licensing, and/or bandwidth quality of service (QOS) reservations costs than would be the case if these costs were based on actual real-time needs.

A need therefore exists for systems and methods which are able to deliver the same end user experience that can be obtained using a conventional WebRTC session, but with greater efficiency and/or control over the utilization of bandwidth and resources needed at any given instant in time.

SUMMARY OF THE INVENTION

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Methods for efficiently allocating ports and bandwidth, in a communication system configured to establish interactive, real time communication sessions between endpoints, are described. According to one or more embodiments, the method receives a request to initiate an interactive, real time communication session from an endpoint requiring access to an interactive session resource, wherein the communication session is at least one of a voice or a video session. In an embodiment, the communication system is a contact center and the interactive session resource is an available contact center agent. Pending availability of the interactive session resource (e.g., a contact center agent), the requester is placed in a queue and a data channel is established between the server and the requester's endpoint device. Resources, which can include an executable program and/or information operative to cause the endpoint device to emulate an active on-hold voice connection period, are downloaded to the endpoint device.

In embodiments, a requester's place in a queue is maintained without the need to maintain a persistent interactive, real-time communication session with the requester's endpoint. According to some embodiments, instructions and/or event notifications are periodically exchanged over the data channel so that the requester's endpoint audibly reproduces music-on-hold, advertising messages, announcements, and wait time estimates according to a locally maintained schedule and using locally stored, rather than streaming content.

In another embodiment, a method of operating an endpoint device configured to exchange information over a network, the endpoint device having a display, a microphone, and a speaker, comprises sending a request to initiate an interactive, real time communication session requiring access to an interactive session resource, wherein the communication session is at least one of a voice or a video session. Pending availability of the interactive session resource, the method establishes a data channel between a server and the endpoint device, and operates the endpoint device, using information received from the server, to emulate an active flow of "real time on-hold messages, updates, queries, IVR prompts, and other information.

In another embodiment, a system for establishing contact between an interactive session resource and an end user comprises one or more processors, and one or more memory devices operatively coupled to the one or more processors and storing computer instructions therein. The one or more processors are configured to execute at least a portion of the program instructions, and the program instructions comprise receiving a request, at a server configured to administer access to the interactive session resource, to initiate an interactive, real time communication session between an endpoint terminal and the interactive session resource. The programming instructions further comprise, pending availability of the interactive session resource, setting up a data channel between the server and the endpoint device used by the requester. The program instructions further comprise transmitting to the endpoint device, over the data channel, at least one of an executable application or information operative to cause the endpoint device to emulate an active flow of "real time on-hold messages, updates, queries, IVR prompts, and other information pending availability of the interactive session resource.

Figure 1:
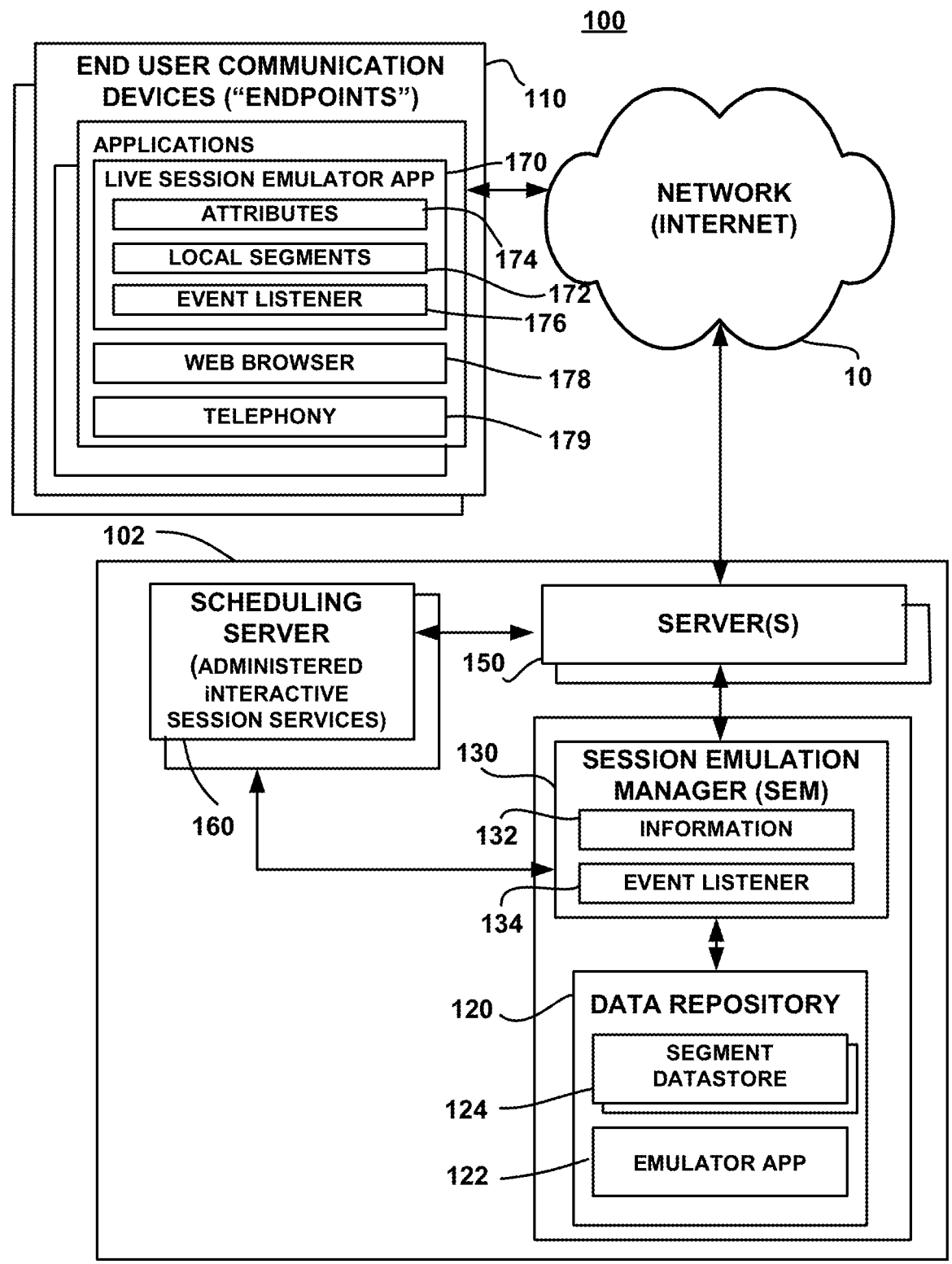
FIG. 1 is a block diagram depicting a communication system configured to dynamically allocate transmission bandwidth and conserve other network resources by causing endpoints operated by end users to emulate the maintenance of a persistent connection or real time delivery of features or services to end users, according to one or more embodiments.

While the method and apparatus is described herein by way of example for several embodiments and illustrative drawings, those skilled in the art will recognize that the method and apparatus for dynamically responding to requests and queries for information relating to one or more event invitees or attendees is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for dynamically responding to requests and queries for information relating to one or more event invitees or attendees defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Systems and methods for dynamically and efficiently allocating ports and bandwidth, preceding the setup of interactive, real time communication sessions between a requesting endpoint and another endpoint, are described. According to embodiments, such allocation is achieved by emulating the real time delivery of features or services to one or more end users. According to one or more embodiments, the method receives requests to initiate an interactive, real time communication session from an endpoint seeking access to an interactive session resource, wherein the communication session is at least one of a voice or a video session. In some embodiments, the requests are WebRTC interactive communication session requests received and processed by a contact center, and the interactive session resource to which access is sought by a requester is a connection to the endpoint device of an available contact center agent.

Pending availability of the interactive session resource, the end user of an endpoint ("requester") requesting an interactive communication session is either assigned a place in a queue or scheduled for access to the interactive session resource according to a resource allocation mechanism. In a contact center, for example, queues are maintained by a server to administer access to agents, in a pool of agents, as they become available. According to other embodiments, the interactive session resource comprises a live interactive communication session with a particular intended recipient, one or more participants in a scheduled conference call, or an investor conference permitting interactive access to a voice and/or video event hosted by one or more company officials. In the other exemplary applications, there is no need for a queue, per se, insofar as even a large number of end user endpoints can be granted access to an interactive session resource once the session is scheduled to begin. It suffices to say that at the moment when a request is received from an end user endpoint, the interactive session resources needed to grant it may not be available.

According to one or more embodiments, the aforementioned unavailability is addressed by establishing a data channel between a server and the requester's endpoint device. In WebRTC embodiments, the server itself serves a data communication "endpoint" for purposes of set up, maintenance and administration of the data channel. Over the data channel, instructions, data, and/or a file executable (or, simply, "information") are downloaded from the server and stored locally at the requester's endpoint device. At the beginning of an on-hold period, during which the requester awaits access to the interactive session resource, the downloaded information is used by the requester's endpoint device to emulate an active on-hold voice connection period. That is, content is locally retrieved from the memory of the requester's endpoint device, and this content is used to generate and audibly and/or visually reproduce to the requester a sequence of messages.

The locally retrieved and played and/or displayed content can include music-on-hold, wait time updates or updated wait time estimates, general instructions, queries for information to be supplied by the end user over the data channel as by a locally displayed IVR menu, and messages of general interest to a community of persons. According to embodiments, instructions and/or event notifications are periodically exchanged over the data channel so that the requester's endpoint audibly reproduces the music-on-hold, advertising messages, announcements, and wait time announcements or estimates according to a locally maintained schedule and using the locally stored, rather than streaming content This allows a requester's place in a queue (or other access allocation scheme) to be reserved, maintained, and even adjusted. At the same time, the set up of a persistent interactive real-time communication session, between the requester's endpoint and an endpoint, is deferred until such a connection is actually needed.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference will now be made in detail to exemplary embodiments of the present invention, examples of which are illustrated in the accompanying drawings. Wherever possible, the same reference numbers will be used throughout the drawings to refer to the same or like parts FIG. 1 is a block schematic diagram depicting a communication system 100 configured to dynamically allocate transmission bandwidth and conserve other network resources by emulating the real time delivery of features or services to one or more end users of communication devices ("end points") 110 such as smart phones, tablet computers, wearable computers, notebook computers and the like. According to some embodiments, system 100 includes an interactive session administration center 102 which includes a session emulation module 120 having a session emulation manager (SEM) 130 and a data repository 140.

Interactive session administration center 102 further includes one or more voice/data servers as, for example, WebRTC/call servers 150 for establishing and maintaining interactive communication sessions between end user endpoint devices 110 and interactive session resources administered by one or more scheduling servers 160. According to some embodiments, the endpoint devices 110 are configured to perform certain functions and to perform those functions at particular times pending set up of a live interactive communication session. At least some of these functions emulate the maintenance of a persistent connection or the real time delivery of features or services to an end user of the endpoint. To this end, endpoint devices 110 are configured to execute a live session emulator application 170, which includes local segments 172, dynamically configurable attributes ("attributes") 174, and an event listener 176. Other applications typically residing on an endpoint device, especially on a mobile terminal such as a Smartphone, tablet or wearable computer, or notebook computer, include a web browser 178 and a telephony application or IP soft phone client 179.

At the time when interactive session administration center 102 receives a request from endpoint device 110, the aforementioned session emulator application 170 may already installed on the endpoint device 110. If not, then in accordance with some embodiments, SEM 130 retrieves an emulator application installer 122 from data repository 120. A data channel is set up by server 150 between endpoint 110 and SEM 130, and the installer is downloaded to and launched by the endpoint device 110. In some embodiments, this data channel is set up in accordance with WebRTC specifications. Even an already-installed instantiation of emulator application 170 may require up-to-date information for emulating the appropriate user experience, according to some embodiments. To this end and in accordance with such embodiments, SEM 130 stores and dynamically updates any configuration information ("information") 132 needed by session emulator application 176 to deliver an emulated user experience applicable to the end user's current session request. The information is sent over the same data channel set up by server 150 between endpoint 110 and SEM 130.

It should be emphasized, and will be readily apparent to the artisan of ordinary skill that other methods and protocols for establishing a data session or channel may also be utilized, besides WebRTC, may be employed For example, without regard to whether a locally installed session emulation application as application 176 is installed, or whether a client invoked by browser 178 is used to invoke the same functions via a remote webserver, the data channel need not require any more than exchange of simple SMS messages between endpoints. Initially, for example, an SMS setup message may be sent by SEM 130 to the endpoint device 110. In an embodiment, an SMS setup message includes an hypertext markup language (HTML) link to a webserver location. From this location, the user of endpoint 110 can invoked a browser client or commence downloading, installation and/or launching the emulator application, as the case may be.

Moreover, it should be further noted that a requester is not limited to the use of a single endpoint in carrying out various embodiment described herein. For example, according to some embodiments, a user makes an initial request for a real time interactive communication session on a public switched transmission network (PSTN) using a first endpoint such as a voice-only standard telephone, but establish a subsequent data session as described in embodiments herein via a second endpoint device such as a Smartphone or other device having the attributes and functionality of an endpoint device as device 110. In such embodiments, a failure to maintain the PSTN connection during an "on-hold period" does not result in the calling party's place in a queue. Rather, the data channel is maintained and when the interactive communication resource(s) become(s) available, a new call to the original PSTN endpoint can be placed or the calling party can continue to use the second endpoint.

The information 132 typically includes one or more media segments retrieved from segment datastore 124 of data repository 120, as well as instructions pertaining to the order in which those segments should be audibly reproduced and/or visually displayed to the end user's endpoint device 110 as part of the emulated user experience. In contact center applications, such dynamically variable attributes as currently estimated wait time can also be included as part of information 132. Event listener instructions 176 and 134, forming part of the emulator application 170 and SEM 130, respectively, detect and report state changes associated with device 110 and server(s) 160, respectively. Responsive to a change in state or availability of the endpoint 110 or a resource administered by server 160, as the case may be, one or more dynamically variable attributes are updated by SEM 130 and instructions for endpoint 110 to update the attribute(s) are sent by SEM 130 over the data channel established by server 150.

Figure 2:
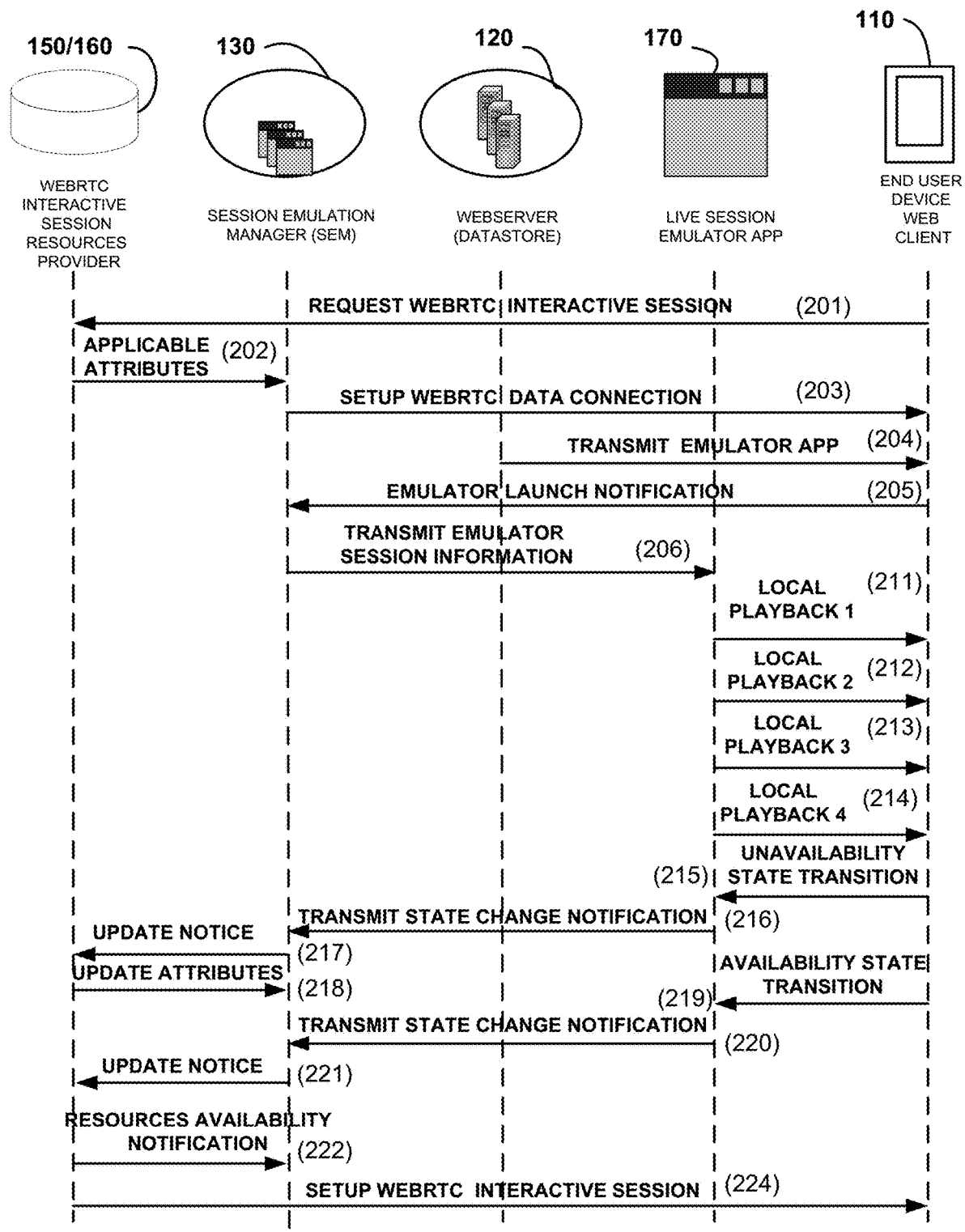
FIG. 2 is a sample event flow diagram depicting communication flows to deliver a bandwidth efficient and resource conserving emulated experience to the user of a communication terminal endpoint, according to one or more embodiments.

FIG. 2 is a sample event flow diagram depicting communication flows to deliver a bandwidth efficient and resource conserving emulated experience to the user of a communication terminal endpoint, according to one or more WebRTC embodiments of the system 100 depicted in FIG. 1. As seen in FIG. 2, an end user device 110 executing a web client such as a browser navigates to a web page and initiates a request 201 to establish a WebRTC interactive communication session with an endpoint administered by a WebRTC interactive session resources servers 150-160. Initially, only a WebRTC data connection ("channel") 51 (FIG. 1) is set up, between a server (e.g. 150 or 160) and endpoint 110. If the emulator application 170 is not yet installed on the endpoint 110, it is downloaded 204 from datastore 120 via a webserver, and then launched on the endpoint 110.

A notification 205 that the emulator 170 has been launched is transmitted over the data channel, and SEM 130 sends 206 configuration instructions to the emulator application 170. In accordance with a prescribed order set by the configuration instructions received from SEM 130, emulator application 170 sends instructions 211-214 causing a web client of endpoint 110 to retrieve and play and/or display locally stored media content furnished earlier (i.e., not in "real time") by SEM 130. An event listener associated with emulator application 170 receives an unavailability event state transition notification 215 from endpoint device 110, indicating that the end user of device 210 would be unavailable if an interactive communication session were to begin during the corresponding event. By way of example, the end user may receive and accept a phone call, or initiate one, using an IP telephony client, while waiting for an interactive WebRTC communication system to begin. In such event, the end user does not lose his or her place in a queue or reservation to an upcoming interactive event. Instead, emulator application 170 transmits an unavailability state change notification at 216 to SEM 130, and SEM 130 forwards the notification as an update notice 217 to a scheduling or queue manager agent (not shown) of scheduling server 160. In some embodiments, the event listener is not always active, but responds to a trigger request, originating from the interactive communication system, indicative of imminent availability of the requested interactive communication resource to the user of endpoint 110.

Responsive to state change transition notification 216, scheduling server 160 transmits a corresponding reservation update notification 217, if appropriate to SEM 130. In some non contact center embodiments, the reservation is unaffected by an unavailability state change. Consider, for example, that an event such as a shareholder meeting, multi-participant webinar, or online education class may employ a server, associated with scheduling server 160, as one WebRTC endpoint to facilitate a "live" interactive communication session comprising many peer to peer WebRTC communication sessions. In some embodiments, when such a multi-participant event begins, WebRTC interactive communication resources are reserved for the unavailable user and a notification (not shown) is sent, via SEM 130, to the emulator application 170 to alert the end user that the event has commenced. A message may, for example, be displayed automatically to the endpoint 110 at the initiation of the emulator application 170 (e.g., rendered to the web client user interface) in order to notify the end user that he or she may join the conference when he or she is ready.

In other embodiments, however, where the intended interactive session is to be between two individuals as, for example, in a contact center or peer-to-peer telephony scenario, scheduling server 160 responds to update notice 217 by transmitting an update attributes notification 218 to SEM 130. Such attributes are, in some embodiments, the means by which the emulator application 170 is dynamically updated to accommodate an updated state change. By way of illustration, the attributes may specify a new announcement or menu to be displayed to the end user or that an existing message stored in memory of device 110 be updated or modified to include a new hold message wait time.

In any event, and with continued reference to the embodiment of FIG. 2, it will be seen that a notification 219 of an availability state event transition (e.g., the termination of an IP telephony or Skype call) is received by the event listener of emulator application 170 and a notification of the state change 220 is transmitted by emulator application 170 over the data channel 51 (FIG. 1) to SEM 130. Update notice 221 from SEM 130 is received by scheduling server 160 which, in the illustrative example of FIG. 2, is now able and ready to make interactive communication session resources available to the user of endpoint device 110. To this end, a resources available notification 222 is sent by scheduling server 160 to the SEM 130, and a "live" WebRTC interactive communication session (i.e., an audio and, optionally video channel) 224 is initiated between a resource administered by scheduling server 160 and the endpoint device 110.

According to some contact center embodiments, the SEM is configured to perform certain on-hold emulation functions which are implemented in a specialized instantiation of a SEM referred to herein as a hold session emulation manager or simply, an "HSEM". According to some embodiments, an HSEM is programmed to:

- enable the Web browser of a user who initiates a WebRTC contact center request to emulate certain features and functions heretofore performed "in real time" by the contact center via a reserved open channel. These functions can include playback of hold music, status messages or other messages, as well as audible reproductions of menu prompts. To accomplish this without reserving a continuously active "voice" channel, the HSEM downloads a "setup" file to the user's endpoint over a data channel or provides the user with instructions for downloading the application from a web-server;

- in some embodiments, the setup file includes the hold music, messages, or prompts to be played, with a session emulator application program adapted to cause any of the foregoing to be played to the caller in accordance with instructions. The same data channel can be used to update or replace any of the messages during the course of the call, and/or to alter the manner in which they are audibly reproduced, and to transfer control of the session back to the contact center at the appropriate time. In this way, resources are conserved and freed up at the contact center side during the time the caller is waiting to be connected to an agent (i.e., before support for a "real time" conversation between agent and caller becomes necessary).

- for users that prefer a virtual queue/callback model, a WebRTC data session ("channel") established to support hold session emulation, according to embodiments, can remain active and monitor if the user is free/available. The user could also indicate to the scheduling function of a contact center the user's current intentions (e.g., via an off/on switch on the web page through which the WebRTC session is launched). This information can be taken into account when connecting the user to the contact center agent. Note that no explicit outbound call is needed in this scenario: the WebRTC session is connected to the contact center agent at the correct time.

- a distinctive feature of some embodiments is that the user remains connected to a contact center, during the entirety of a hold session, via a low-cost data channel that transmits keep-alive and other low bandwidth control/metadata (e.g., via web sockets) with the contact center. A user may terminate the entire session, or save the session to continue it later, using the data channel.

a further aspect of one or more embodiments is the ability to automatically influence the scheduling of the actual live customer/call center connection based on other sessions that the user may have open in the browser. Specifically, if the user of an endpoint receives an incoming WebRTC call and wishes to prioritize this call over the virtual connection with the call center (i.e. by accepting the incoming call), the establishment of the live call center connection can be delayed until the incoming call session has terminated. Likewise, if the user places a WebRTC call while waiting for the call center connection, the latter is rescheduled at least until the former is completed. Additional session prioritization is possible: for example, if the user is actively (and furiously) typing a document in a cloud-based word processor, this session may be prioritized over the call center session and the establishment of the call center connection can be delayed until the user's interaction with the word processor has decreased below a certain activity threshold.

When a contact center agent becomes available for assignment to the requester, the requester may not be available for the intended communication. This may be true even if the requester endpoint has not determined any obvious requester unavailability (concurrent WebRTC call, furious typing, etc.). The requester's endpoint can aid in determining the requester's availability in such a case: the endpoint can pop up a form with several user-selectable choices for the desired start of the communication session, such as "Ready to communicate", "Ready to communicate shortly", "Need extra time", "Cancel", etc. The list of choices is part of the initial download to the user endpoint and can be dynamically adjusted at download time and during the wait time depending on current contact center conditions (hours of operation, current agent pool, agent utilization, etc.). When the requester chooses from the list of communication start options, the choice is transmitted to the contact center. It results in one of several possible actions both in the endpoint and in the server. For example, for "Ready to communicate now" it would the immediate establishment of a WebRTC connection between both. For "Ready to communicate shortly", the connection may be delayed by one minute. For "Need extra time", the agent would be returned to the pool of available agents and when the next agent is available, the requester would again receive the same popup.

Figure 3:
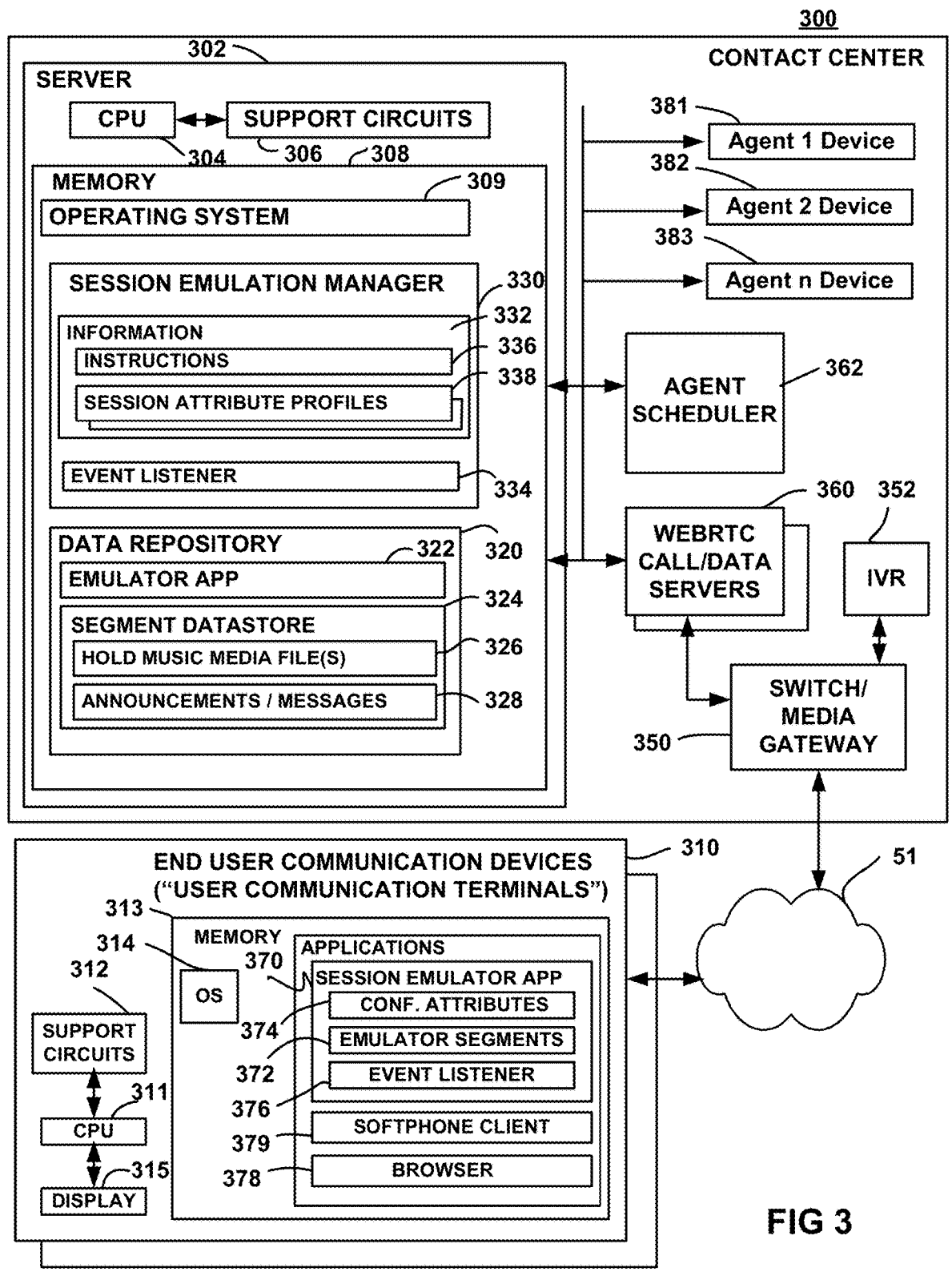
FIG. 3 is a block diagram depicting, in greater detail, the interaction between functional components of a communication system constructed according to the embodiments exemplified by FIG. 1.

FIG. 3 is a block diagram depicting the interaction between the functional components of a contact center system 300 according to embodiments exemplified by the generalized system of FIG. 1. The various components of system 300, including server 302, switch/media gateway 350, interactive voice response (IVR) system 352, WebRTC Call/Data Server 360, agent scheduler 362, and agent devices 381-383. These components are connected to one another, and to user communication terminals (endpoints) 310, by one or more network links. Some of the links are established by a network which includes a communication system that connects computers (or devices) by wire, cable, fiber optic and/or wireless link facilitated by various types of well-known network elements, such as hubs, switches, routers, and the like. The network interconnecting some components may also be part of the Intranet using various communications infrastructure, such as Ethernet, Wi-Fi, a personal area network (PAN), a wireless PAN, Bluetooth, Near field communication, and the like.

The various servers 302, 350 and 360 are each a computing device, or may be the same computing device as, for example, a desktop computer, laptop, tablet computer, and the like, or they may be cloud based servers e.g., a blade server, virtual machine, and the like. Interactive access to each of Agents 1-n, each associated with a corresponding one of devices 381, 382 and 383, respectively, is administered by agent scheduling server 362. WebRTC voice connections are established between a user endpoint, as endpoint 310, and one of the agent endpoints 381-383 administered by WebRTC call server 360.

Prior to establishing a WebRTC voice connection between the aforementioned endpoints, however, contact center system 300 is configured to emulate hold sessions using the data channel capabilities of WebRTC servers, as opposed to sending a stream of packets ready to be audibly reproduced as they arrive or after buffering. To this end, according to some embodiments, server 302 includes a hold session emulation manager (HSEM) comprising a set of instructions residing in memory 308 and executable by a Central Processing Unit (CPU) 304. The CPU 304 may include one or more commercially available microprocessors or microcontrollers that facilitate data processing and storage. Various support circuits 306 facilitate the operation of the CPU 304 and include one or more clock circuits, power supplies, cache, input/output circuits, and the like. Support circuits 306 also include network interfaces for establishing connections between other components (e.g. agent scheduling server 362) of contact center 300. The memory 308 includes at least one of Read Only Memory (ROM), Random Access Memory (RAM), disk drive storage, optical storage, removable storage and/or the like. In addition to hold session emulation manager 330, memory 308 includes an operating system 309.

As in the generalized SEM 130 depicted in FIG. 1, HSEM 330 includes information 332, comprising instructions 336 and session attributes with the latter being organized as session attribute profiles 338. According to some embodiments, a session attribute profile includes segments (e.g. media content, graphic files, and other data) to be downloaded to and locally stored at the endpoint devices 310, and specific data attributes identifying, for example, a specific playback or presentation order to be executed by the endpoint device. As another example, a set of specific numeric hold times in minutes as, for example, the set of values {"9", "4", "1"} could be sent from HSEM to the endpoint device 310. These values signify that the same audio segment locally stored in the memory of the endpoint device 310 such, for example, as "we now estimate your time on hold to be another {_} minutes" could be modified three separate times for playback, at discrete points in time during a simulated hold session. Alternatively, three separate media files each corresponding to a different one of those three estimates, might be retrieved and/or presented visually to the end user of endpoint 310 in a particular order specified by the instructions 336. It suffices to say, that with an appropriate emulator program configured to process the instructions 336 and profiles 338, a highly customizable and feature rich on-hold experience can be presented to an end user without tying up WebRTC interactive voice and/or video communication resources.

HSEM 330 further includes an event listener 334, which enables the aforementioned data attributes and instructions to be dynamically modified, as necessary in response to state changes such, for example, as the availability of the user of endpoint device 310 on the one hand and revision of hold time estimates by agent schedule 362 on the other. A data repository 320, which may reside at a webserver situated remotely relative to HSEM 330, comprises a segment data store 324 which includes hold session media files 326 as well as announcements and other content 328 available for download to endpoints 310. The data repository further includes an installer 322, by which any endpoint device invoking a connection to the WebRTC server can retrieve, install and configure the hold session emulation application if it is not already have the application installed.

Turning now to the end user communication terminals or endpoint devices themselves, it will be seen from FIG. 3 that each endpoint device 310 is a computing device, for example a desktop computer, notebook, tablet computer, Smartphone, wearable computer or the like that includes or is connected to a display and also includes user input devices such as a mouse, keyboard, touch screen, camera, microphone, etc. In the illustrative embodiment of FIG. 3, the user endpoint device 310 is a computer tablet that includes a Central Processing Unit (CPU) 311, support circuits 312, a memory 313, as well as a network interface adapted to communicatively couple terminal 310 to server 302 via one or more wireless internet connections or other network connections.

CPU 311 includes one or more commercially available microprocessors or microcontrollers that facilitate data processing and storage. The various support circuits 312 facilitate the operation of CPU 311 and include one or more clock circuits, power supplies, cache, input/output circuits, and the like. The memory 313 includes at least one of Read Only Memory (ROM), Random Access Memory (RAM), disk drive storage, optical storage, removable storage and/or the like. The memory 313 includes an operating system 314 that provides a computing foundation for software applications of the user endpoint device 310. The memory 313 includes applications such as a browser 378, for invoking a client configured to request initiation of a WebRTC interactive communication session to one of the aforementioned agent endpoints 381-383 administered by WebRTC call server 360. Other applications residing in memory of endpoint devices 310 include an IP soft phone client 379, and in accordance with one or more embodiments, session emulator application 370.

As already noted, in accordance with some embodiments, the endpoint devices 310 are configured to perform certain hold session functions and to perform those functions at particular times pending set up of a live interactive communication session. In some embodiments, the functions include, at any given point in time, audible playback of music-on-hold, announcements and/or advertising messages, and queries for information to be provided by the user, as well visual display of announcements, display of IVR prompts and/or queries, and the like. To initiate such functionality, the live session emulator application 370 is either downloaded to and launched by the endpoint 310, or if it is already there, it is launched.

As part of the information accompanying the installer for application 370, which includes local segments 37 (media files, scripts, images), dynamically configurable attributes ("attributes") 174, and an event listener 176. Other applications typically residing on an endpoint device, especially on a mobile terminal such as a Smartphone, tablet or wearable computer, or notebook computer, include a web browser 178 and a telephony application or IP soft phone client 179.

Figure 4:
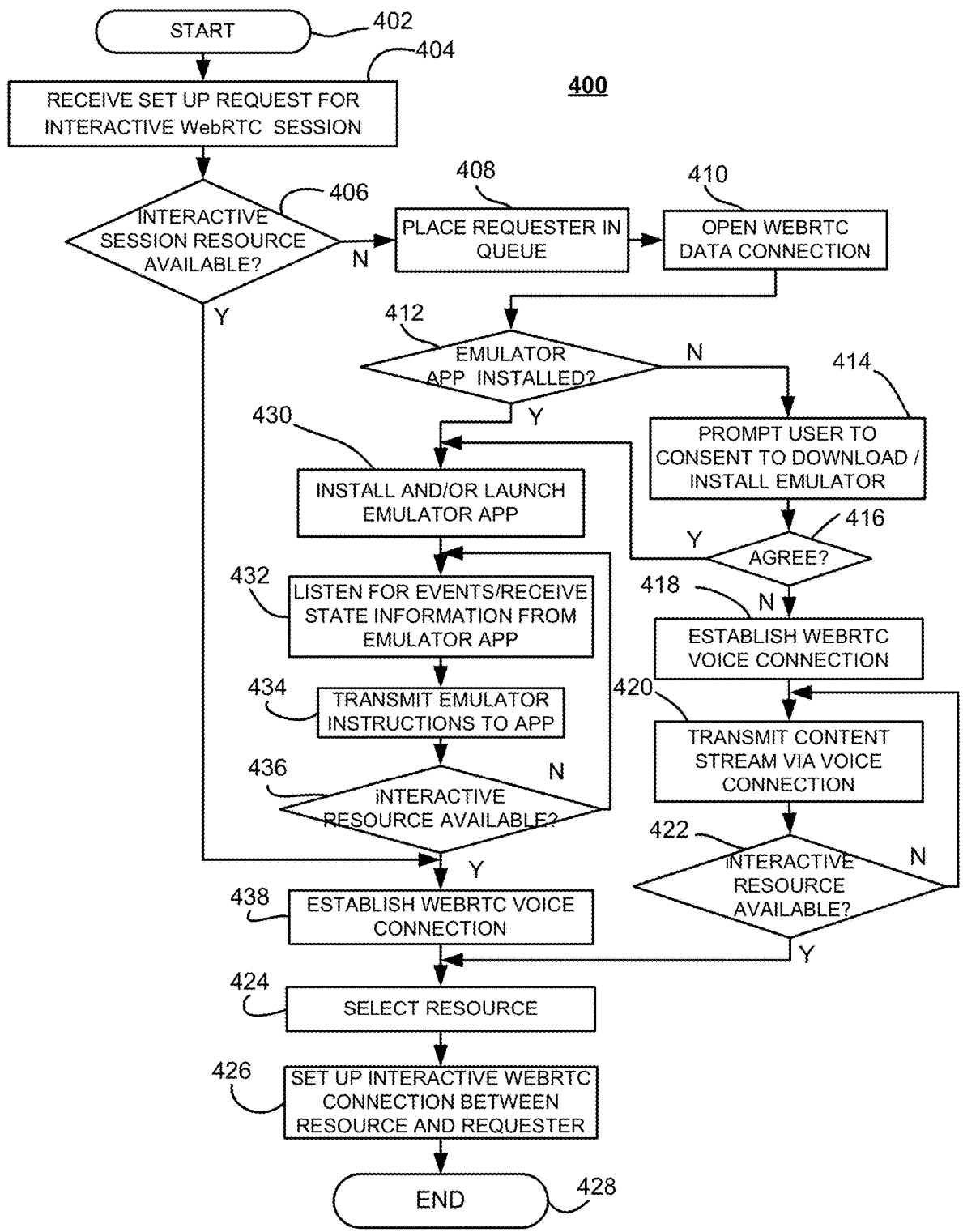
FIG. 4 is a flow diagram depicting a method for dynamically allocating transmission bandwidth and conserving other network resources by causing endpoints operated by end users to emulate the maintenance of a persistent connection and/or the real time delivery of features or services to their devices, according to one or more embodiments.

FIG. 4 is a flow diagram depicting a method 400 for dynamically allocating transmission bandwidth and conserving other network resources by causing endpoints operated by end users to emulate the maintenance of a persistent connection and/or the real time delivery of features or services, according to one or more embodiments. The method 400 is applicable to the generalized communication system 100 depicted in FIG. 1. The method is entered at step 402 and proceeds to step 404. At step 404, the method receives a request from an endpoint device user to set up an interactive WebRTC session. The method proceeds to determination step 406.

At step 406, a determination is made by the method 400 as to whether an interactive session resource is available and, if not, the method advances to step 408. At step 408, the end point user is assigned to a queue or scheduler and, pending availability of the interactive session resource, the method advances from there to step 410. At step 410, the method opens a WebRTC data connection (channel) and, at determination step 412, determines whether a session emulator is already stored and executable by the requesting endpoint. If not, the method 400 advances to step 414 where the method prompts the user to consent to the download and installation of the local emulator application. The process proceeds to determination step 416.

It should again be emphasized that although embodiments have been illustrated and described by reference to an emulator application downloaded, installed, and launched with the consent of an endpoint user, other options are contemplated herein. In modified embodiments, steps 410-416 may be replaced by an event flow in which the user of the requesting endpoint is prompted by an SMS message to click on a link establishing a web browser connection to a webserver which delivers the same content and functionality as the local emulator application. The web browser client captures and reports event state transitions to the webserver for relay to the remote SEM, and performs all necessary processes (display of prompts, menus, options, messages, and playback of media) as necessary to provide the same user experience as would otherwise be delivered if a local emulator application were being executed.

At determination step 416, if the end user does not consent to installation of the local emulator application, the method 400 proceeds to step 418 and sets up a "real" hold session by establishing a WebRTC real time voice communication connection to the user endpoint and, at step 420, transmitting a "live" content stream to the end user via this connection. The process advances to determination step 422 where method 400 determines whether interactive session resources are available to the end user receiving the live "hold session" content stream. If not, the method 400 returns to step 420 and continues to send the aforementioned live content stream. If, on the other hand, the interactive session resource is available, then the method advances to step 424, the resource is selected, and the method advances to step 426 where an interactive WebRTC connection is established between the endpoints associated with the interactive session resource and the requesting end user, respectively.

If, at determination step 406, it is instead determined that an endpoint associated with the interactive session resource were available for connection to the end user, method 400 advances directly to step 438, reserves the resources for an interactive WebRTC interactive communication session, and then proceeds to step 424 as previously described.

If, at determination step 412, method 400 determines that the local session emulator application is installed on the end user's endpoint device, or if at determination step 416 the end user consents to downloading and installation of the local session emulator application, the method 400 advances to 430. At step 430 the local emulator application is either installed and launched, or if it already installed, then it is launched. The method 400 proceeds to step 432, and begins listening for events indicative of, for example, an availability state change or other notification from sent by the local emulator application. The method then proceeds to step 434 and transmits information (e.g., instructions, data attributes, and updated media content for future presentation/replay) to the end user endpoint. The method proceeds to determination step 436.

At step 436, the method 400 determines whether the interactive session resource requested is available. If not, the method returns to step 432 and continues listening for event transitions or updates from the emulator application and/or the scheduler for the interactive session resource. Once the resource becomes available, the method 400 advances to step 438, and reserves resources and a connection for the WebRTC interactive communication session between the end user and the now-available interactive communication session resource. The method proceeds to step 424 and proceeds from there as already described.

Figure 5:
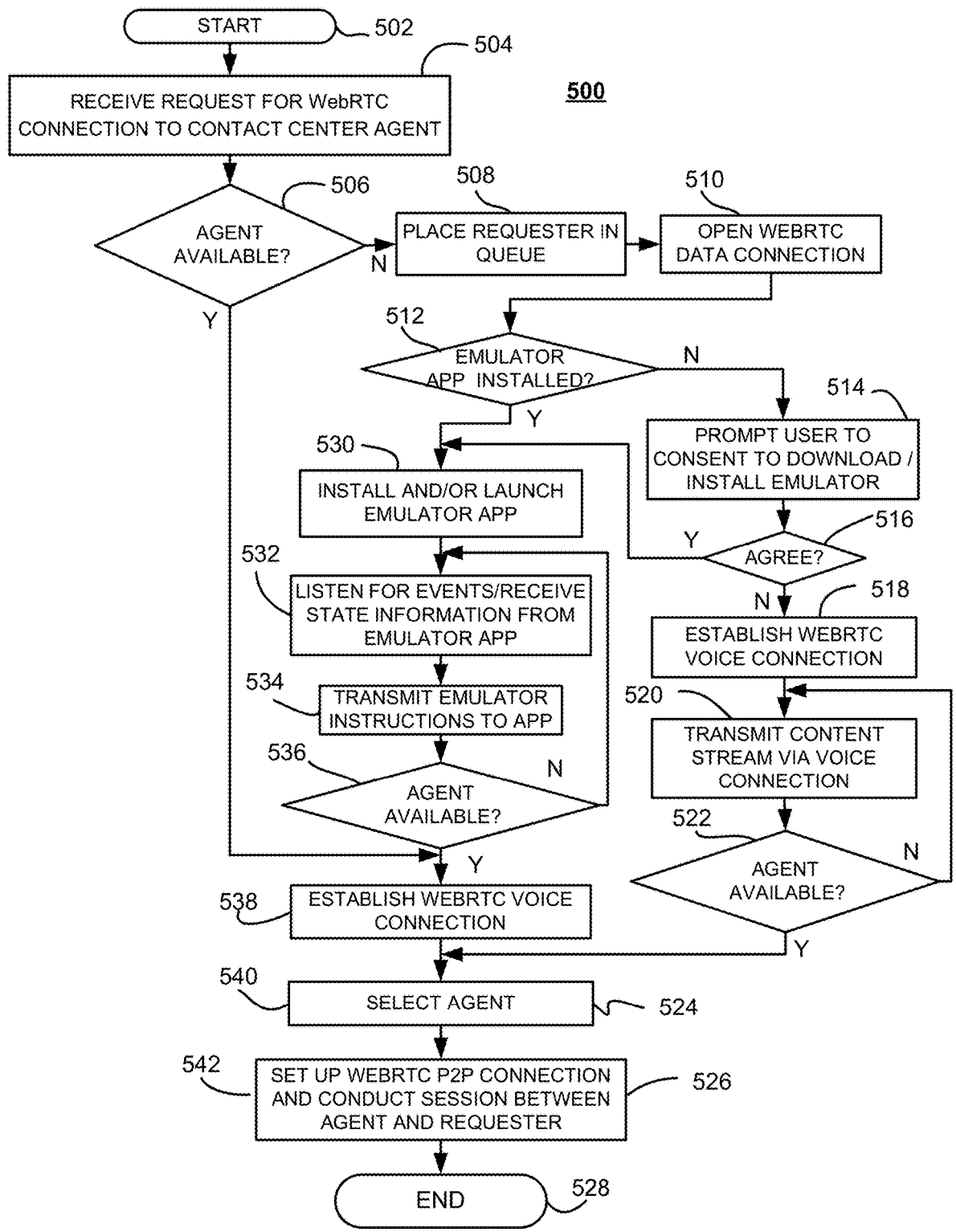
FIG. 5 is a flow diagram depicting a method for dynamically allocating transmission bandwidth and conserving other network resources by causing endpoints operated by end users seeking access to a contact center agent to emulate the maintenance of a persistent connection and/or the real time delivery of features or services, according to one or more embodiments.

FIG. 5 is a flow diagram depicting a method 500 for dynamically allocating transmission bandwidth and conserving other network resources by causing endpoints operated by end users seeking access to a contact center agent to emulate the maintenance of a persistent connection and/or the real time delivery of features or services, according to one or more embodiments. The method 500 is applicable to embodiments of a contact center 300 exemplified by FIG. 3. The method 500 is entered at step 502 and proceeds to step 504. At step 504, the method receives a request from an endpoint device user to set up an interactive WebRTC session between the endpoint user and a contact center agent. The method proceeds to determination step 506.

At step 506, a determination is made by the method 500 as to whether an agent is available and, if not, the method advances to step 508. At step 508, the end point user is assigned to an agent selection queue and, pending availability of the agent associated with a WebRTC endpoint, the method advances from there to step 510. At step 510, the method opens a WebRTC data connection (channel) and, at determination step 512, determines whether a session emulator is already stored and executable by the requesting endpoint. If not, the method 500 advances to step 514 where the method prompts the user to consent to the download and installation of the local emulator application. The process proceeds to determination step 516.

At determination step 516, if the end user does not consent to installation of the local emulator application, the method 500 proceeds to step 518 and sets up a "real" hold session by establishing a WebRTC real time voice communication connection to the user endpoint and, at step 520, transmitting a "live" content stream to the end user via this connection. The process advances to determination step 522 where method 500 determines whether end user's place in the queue is now such that an agent is presently available to the end user receiving the live "hold session" content stream. If not, the method 500 returns to step 520 and continues to send the aforementioned live content stream. If, on the other hand, the agent is available, then the method advances to step 524, the agent is selected, and the method advances to step 526 where an interactive WebRTC connection is established between the endpoints associated with the agent and the requesting end user, respectively.

If, at determination step 506, it is instead determined that an agent is available for connection to the end user, method 500 advances directly to step 538, reserves the resources for an interactive WebRTC interactive communication session, and then proceeds to step 524 as previously described.

If, at determination step 512, method 500 determines that the local session emulator application is installed on the end user's endpoint device, or if at determination step 516 the end user consents to downloading and installation of the local session emulator application, the method 500 advances to 530. At step 530, the local emulator application is either installed and launched, or if it already installed, then it is launched. The method 500 proceeds to step 532, and begins listening for events indicative of, for example, an availability state change or other notification sent by the local emulator application. The method then proceeds to step 534 and transmits information (e.g., instructions, data attributes, and updated media content for future presentation/replay) to the end user endpoint. The method proceeds to determination step 536.

At step 536, the method 500 determines whether end user's place in the queue is such that an agent is now available. If not, the method returns to step 532 and continues listening for event transitions or updates from the emulator application and/or the agent scheduler. Once an agent becomes available, the method 500 advances to step 538, and reserves resources and a connection for the WebRTC interactive communication session between the end user and the now-available agent. The method proceeds to step 524 and proceeds from there as already described.

Figure 6A:
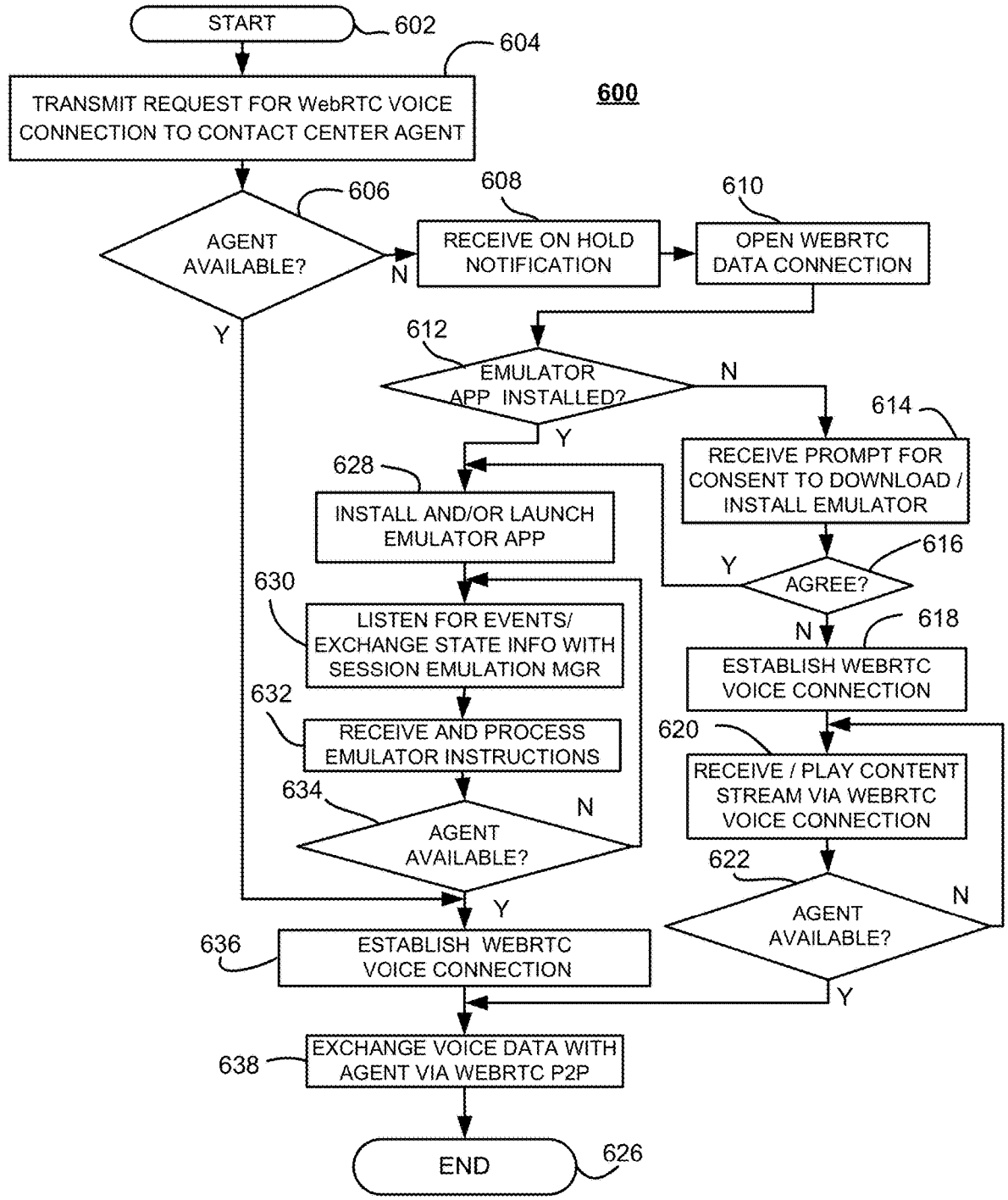
FIG. 6A is a flow diagram depicting a method for operating an end user endpoint configured to emulate the maintenance of a persistent connection and/or real time delivery of features by a contact center, according to one or more embodiments.

FIG. 6A is a flow diagram depicting a method 600 for operating an end user endpoint configured to emulate the maintenance of a persistent connection and/or real time delivery of features by a contact center, according to embodiments. The method 600 is entered at step 602 and proceeds to step 604. At step 604, the method transmits a request, typically by launching a browser client via an endpoint such as a mobile terminal (e.g. Smartphone, tablet computer, or notebook computer), for a WebRTC voice or other interactive communication session with a contact center agent. The method 600 proceeds to determination step 606.

At determination step 606, the method determines whether or not an agent is currently available. If not, the method proceeds to step 608 and causes an on-hold message to be displayed on the end user's endpoint device. The method proceeds to step 610 and opens a WebRTC data connection between the contact center and the endpoint. At step 612, the method determines whether a local session emulator application is already installed on the user's endpoint. If not, the method 600 proceeds to 614 and displays a prompt to the display of the endpoint, inviting the user to consent to the download and launch of an installer. The method proceeds to step 616 and determines whether or not the end user agrees to the download and installation. If not, the method proceeds to step 618 where resources for a conventional interactive WebRTC communication session are allocated for a connection between the contact center and end user's terminal, and a "live on-hold session" is established therebetween. During sessions of this type, the method receives at step 620 a real time stream of packets used by the browser of his or her endpoint to generate real-time audio and/or video updates, as well as IVR functionality (queries and response handling, etc). At step 622, the method determines whether or not the end user's place in the queue is such that an agent is available and, if so, the method proceeds to step 638, wherein the interactive connection to an agent endpoint is initiated and voice data is exchanged via an interactive WebRTC peer-to-peer connection.

If, at determination step 606, it is instead determined that an endpoint associated with an agent is presently available for connection to the end user, method 600 advances directly to step 638, reserves the resources for an interactive WebRTC interactive communication session, and then proceeds to step 636 as previously described.

If, at determination step 612, method 600 determines that the local session emulator application is installed on the end user's endpoint device, or if at determination step 616 the end user consents to downloading and installation of the local session emulator application, the method 600 advances to 628. At step 628, the local emulator application is either installed and launched, or if it already installed, then it is launched. The method 600 proceeds to step 630, and begins listening for events indicative of, for example, an availability state change or other notification sent by the local emulator application. The method then proceeds to step 632 and receives, from the contact center, information (e.g., instructions, data attributes, and updated media content for future presentation/replay) at the end user endpoint. The method proceeds to determination step 634.

At step 634, the method 600 determines whether the end user's place in the queue is such that an agent is now available. If not, the method returns to step 630 and continues listening for event transitions or updates based on activity associated with other applications executing on the endpoint device and/or the agent scheduler. Once a notification is received from the contact center indicating that an agent has become available, a determination that an agent is available is made at step 634 and the method 600 advances to step 636. At step 634, a WebRTC connection between the end user and the now-available agent is established. The method proceeds to step 638 and proceeds from there as already described. For all event flows, the method terminates at step 626.

Figure 6B:
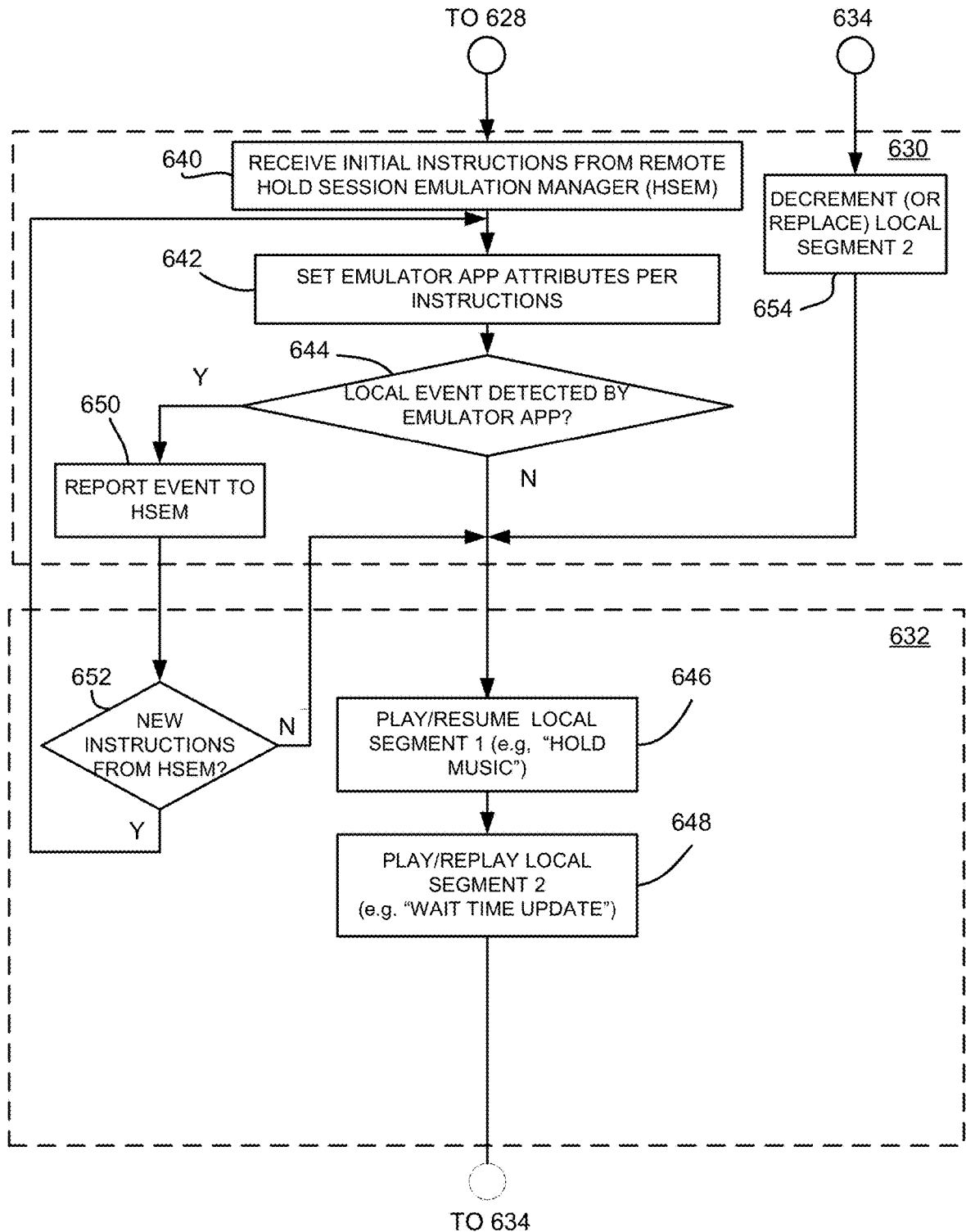
FIG. 6B is a flow diagram depicting sub-steps associated with one or more embodiments exemplified by FIG. 6A.

FIG. 6B is a flow diagram depicting sub-steps associated with one or more embodiments exemplified by FIG. 6A. Specifically, the sub-steps comprising 630 and 632 according to one or more embodiments are shown and will now be described. From step 628, the step 630 of method 600 proceeds to sub step 640, where the method 600 receives initial instructions from the hold session emulation manager (HSEM). The method proceeds to step 642 and configures the data attributes of the local emulator application according to instructions received from the HSEM or, in the absence of such instructions, by a default configuration established at installation. The method 600 proceeds to determination step 644.

At determination step 644, the method determines whether a local event, such as an availability state transition (e.g. a telephony "off hook" event) has been detected by the local emulator app. If not, the method 600 proceeds to step 646, wherein playback of a first locally stored segment (e.g., a selection of on-hold music) is audibly reproduced by the end user's endpoint device. Alternatively, or in addition, the user's device may, at step 646, retrieve and display a locally stored IVR menu to the user's device, and/or display an audio equivalent of this IVR menu as the first segment. The method advances to step 648 where a next local segment (e.g. a wait time update) is played for and/or displayed to the end user using content locally accessed by the user's endpoint device. From here, the method proceeds to step 634 (FIG. 6A).

If a local event was detected at step 644, the method proceeds to step 650 and transmits an event state notification message to the HSEM. At determination step 652, the method determines whether any new instructions—as might have resulted from any event(s) reported at step 650—have been received from the HSEM. If not the method 600 proceeds to step 648. If so, however, the method returns to step 642 and updates the local emulator application and any associated attributes to carry out the new HSEM instruction (s).

From FIG. 6A, it will be recalled that at determination step 634, if an agent is not yet available, the method 600 returns to step 630 and continues to listen for events and/or exchange state information with the HSEM. In some embodiments, an intermediate sub-step 654 (FIG. 6B) is automatically performed by the local emulator application. For example, in embodiments where the emulator is configured to play a specific sequence of audible segments, the method may select the next segment in a sequence or modify one of the segments according to an updated attribute. Thus, for example, if a wait time update containing an "eight minutes remaining update was played by the end user's endpoint device in a previous iteration of step 648, at step 654 the next local segment to be played at step 648 three minutes later might be decremented to a "five minutes remaining" estimate (unless a contrary instruction was received from the HSEM overriding such a subsequent update value).

Figure 7A:
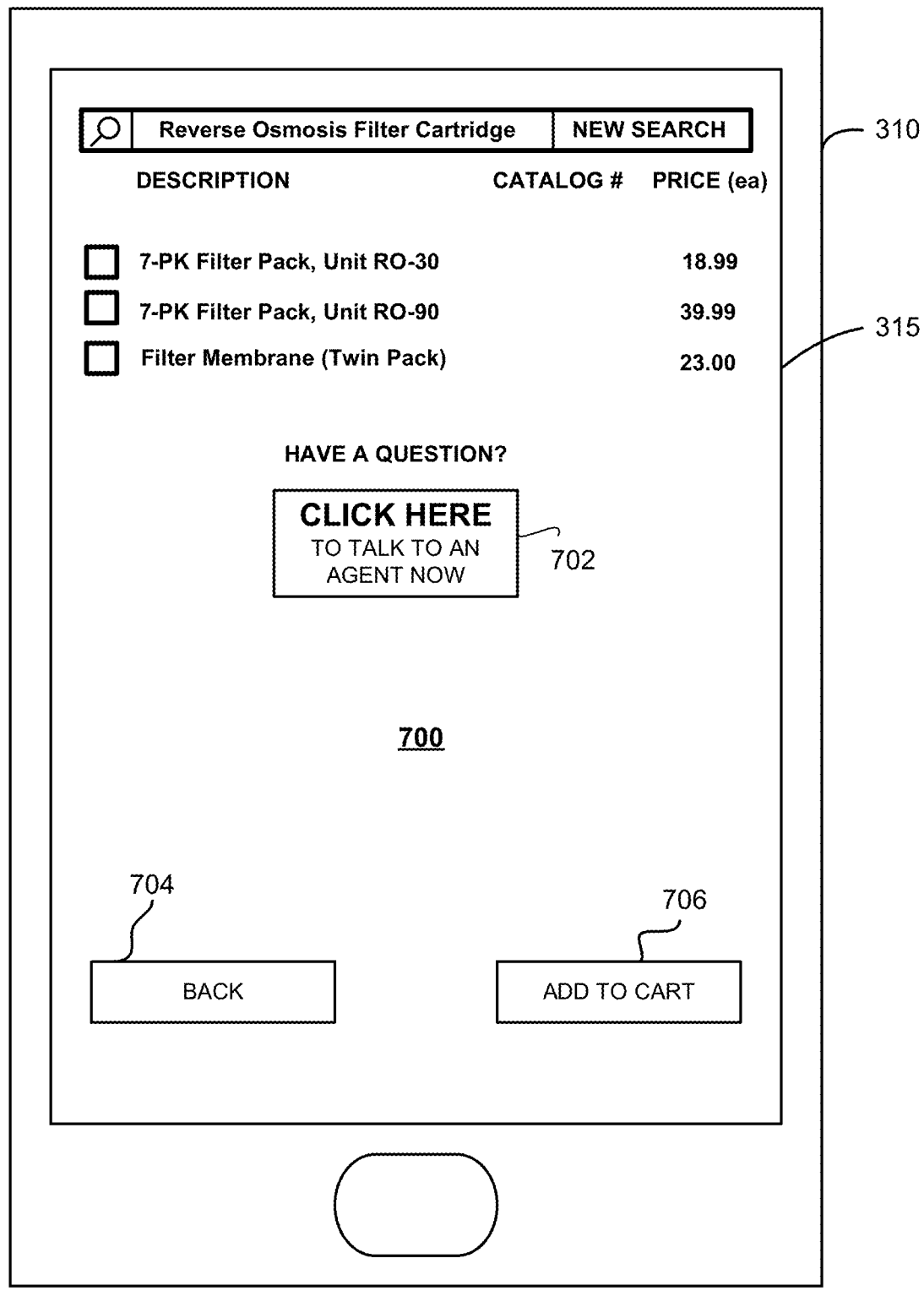
FIG. 7A is a schematic diagram of a browser window on an end user endpoint device, according to one or more embodiments.

FIG. 7A is a schematic diagram of a browser window 700 on the display 315 of an end user endpoint device 310, according to one or more embodiments. In the example shown in FIG. 7A, the user of endpoint communication terminal 310 is presented with an option of initiating a connection to an agent via pop-up window or button 702. Other options presented in the example of FIG. 7A include are navigation buttons 704, to navigate back to a prior window, and 706, to add a displayed product item to a shopping cart.

Figure 7B:
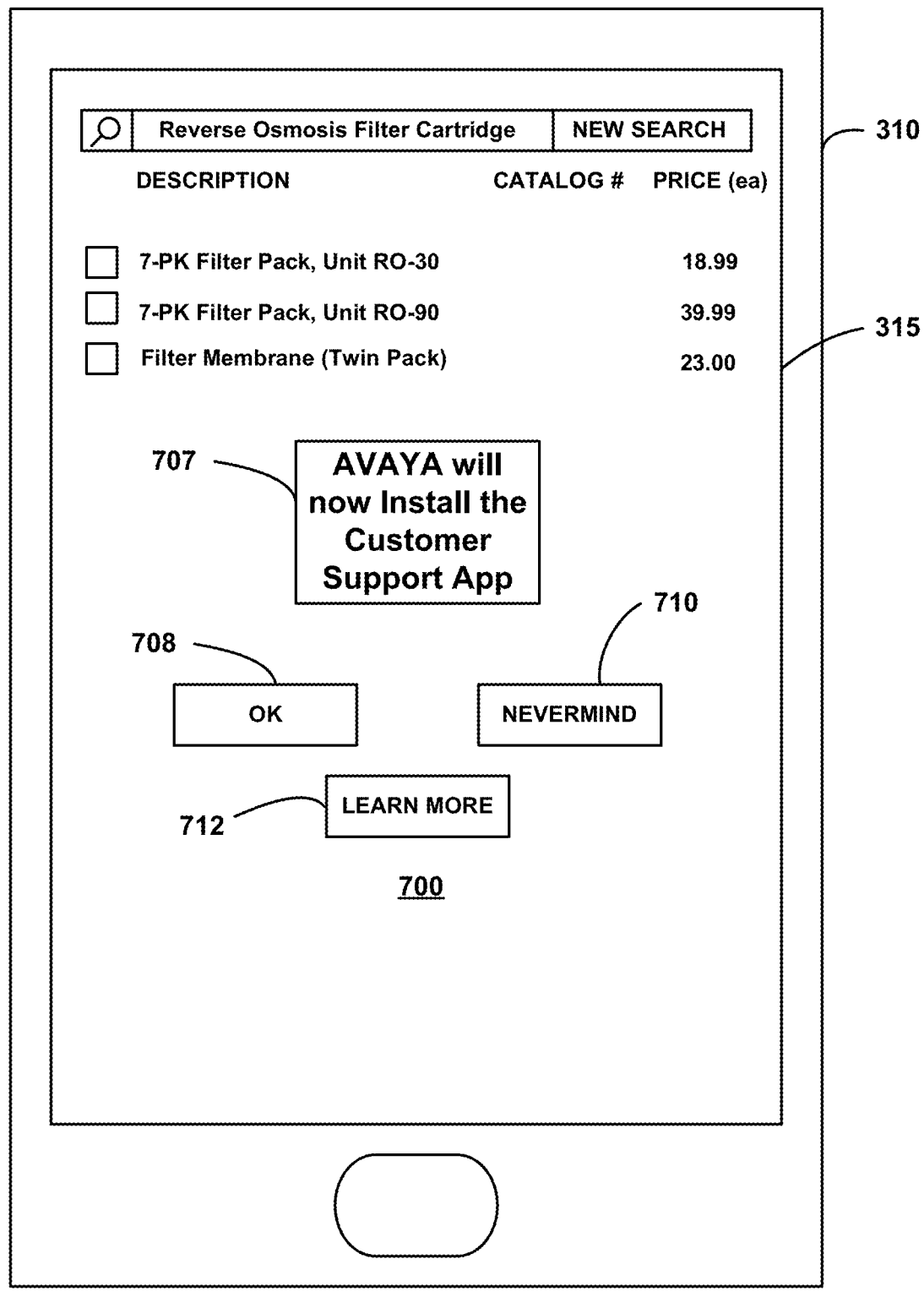
FIG. 7B is a schematic diagram of a browser window following invocation of a WebRTC interactive communication session request via a browser client on an end user endpoint device, according to one or more embodiments.

FIG. 7B is a schematic diagram of the browser client window 700, featured on display 315, following invocation of a WebRTC interactive communication session request. When the browser client invoking the connection is executed on the end user endpoint device 310, according to one or more embodiments, the user is presented with a notification 707 that a local emulator application (identified as a "Customer Support Application" in the exemplary embodiment of FIG. 7B), will now be installed to the endpoint device. At this point the user may either consent to the installation by clicking (or touching) the feature button 708 or reject the installation by clicking (or touching) the feature button 710. Likewise, a user wishing to learn more before making a decision uses feature button 712.

Figure 7C:
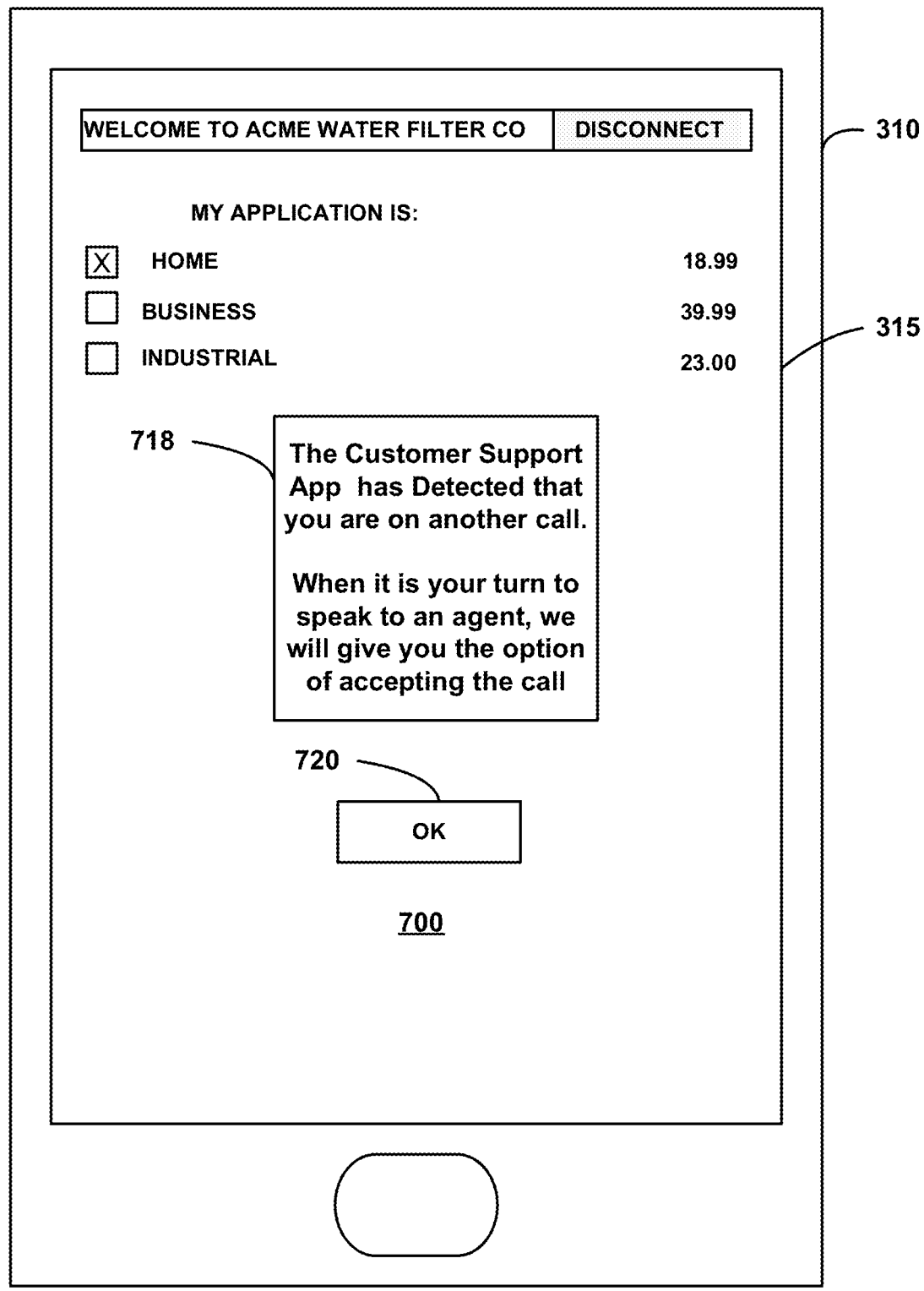
FIG. 7C is a schematic diagram of a notification locally generated by an end user endpoint device, according to one or more embodiments.

FIG. 7C is a schematic diagram of a notification locally generated by an end user endpoint device, according to one or more embodiments. In the exemplary embodiment of FIG. 7C, the browser client, by local execution of the local session emulator program by a processor of the user endpoint device 310, has visually presented a locally generated menu to the display 315 of the device 310 and collected the user's response ("HOME" use) over the established WebRTC data channel. However, the local event listener associated with the local emulator program has detected that the user has accepted an IP telephony call on his or her endpoint device. As a result, a notification 718 is displayed to the user indicating that the user's place in a queue has not yet been affected by this development. The user is given the opportunity to acknowledge the notification by touching or clicking on a displayed feature button 720. According to embodiments, the detection of the event and generation of the displayed notification are performed solely by the emulator program without the need for further exchange of information with the contact center HSEM. In other embodiments, the state change is reported but no further actions are taken by the local emulator program unless and until a need arises to prompt the user for further information. In some embodiments, the user may continue to be presented with locally stored, retrieved and displayed query menus such as the one depicted in FIG. 7C, and hold music and/or audible wait time updates suspended in favor of visual updates for the duration of the user's telephone call.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. For example, although the exemplary embodiments have use WebRTC to intiate real time interactive communication sessions between two or more endpoints, such is by way of illustrative example only. Other techniques such, for example as Adobe Flash are equally applicable and capable of carrying out the objective of receiving and processing request to set up a real time interactive communication session. It should therefore be appreciated that the embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method, comprising:
receiving a request at a server, from a requester endpoint device, to initiate an interactive, real time communication session requiring access to an interactive session resource, wherein the communication session is at least one of a voice or a video session;
pending availability of the interactive session resource, setting up a data channel between the server and the endpoint device used by the requester; and
transmitting to the endpoint device, over the data channel, information, including playback instructions that indicate a specific sequence in which a plurality of audible media segments, stored locally on the endpoint device, should be audibly reproduced by the endpoint device, operative to cause the endpoint device to emulate an active on-hold voice connection period between the server and endpoint device pending availability of the interactive session resource by at least reproducing the plurality of audible media segments in the specific sequence.

2. The method according to claim 1, wherein the information includes an interactive voice response (IVR) menu to be one of displayed or audibly reproduced by the endpoint at a future point during an emulated on-hold connection period, and wherein the method further includes collecting responses from the device.

3. The method according to claim 1, wherein the interactive session resource is a contact center agent, the method further including
pending availability of the interactive session resource, reserving a place in a queue for assignment to a next available contact center agent via an interactive real time connection to an endpoint terminal associated with the next available contact center agent.

4. The method according to claim 1, wherein the plurality of audible media segments includes at least one of one of music-on-hold, an estimate of wait time, marketing messages, or product information messages.

5. The method according to claim 1, further including a step of collecting, over the data channel pending availability of the interactive session resource, current requester availability for start of the interactive, real-time communication session.

6. The method according to claim 5, further including a step of deferring initiation of the real-time interactive communication session based on requester unavailability.

7. A method of operating an endpoint device configured to exchange information over a network, the endpoint device having a display, a microphone, and a speaker, the method comprising:
sending a request to initiate an interactive, real time communication session requiring access to an interactive session resource, wherein the communication session is at least one of a voice or a video session;
pending availability of the interactive session resource, setting up a data channel between a server and the endpoint device; and
operating the endpoint device, using information, including playback instructions that indicate a specific sequence in which a plurality of audible media segments, stored locally on the endpoint device, should be audibly reproduced by the endpoint device, received from the server pending availability of the interactive session resource, to emulate an active on-hold voice connection between the server and the endpoint device by at least reproducing the plurality of audible media segments in the specific sequence.

8. The method according to claim 7, wherein the plurality of audible media segments includes at least one of music-on-hold, an estimate of wait time, marketing messages, or product information messages.

9. The method according to claim 7, further including downloading the plurality of audible media segments to the endpoint device over a data channel established and terminated prior to sending the request.

10. The method according to claim 7, wherein the operating includes, responsive to an instruction received from the server, retrieving and visually displaying a locally stored IVR menu.

11. The method according to claim 10, further including storing responses to the IVR menu and transmitting the responses to the server over the data channel.

12. The method according to claim 7, further including downloading a set up program executable by a processor of the endpoint device to initiate retrieval of the plurality of audible media segments and emulate an active on-hold voice connection.

13. The method according to claim 12, wherein the downloading was performed over a data channel established and terminated prior to sending the request.

14. A system for establishing contact between an interactive session resource and an end user, the system comprising:

one or more processors, and one or more memory devices operatively coupled to the one or more processors and storing computer instructions therein, the one or more processors being configured to execute at least a portion of the program instructions, the program instructions comprising:

receiving a request, at a server configured to administer access to the interactive session resource, to initiate an interactive, real time communication session between an endpoint terminal and the interactive session resource, wherein the communication session is at least one of a voice or a video session;

pending availability of the interactive session resource, setting up a data channel between the server and the endpoint device used by the requester; and transmitting to the endpoint device, over the data channel, information, including playback instructions that indicate a specific sequence in which a plurality of audible media segments, stored locally on the endpoint device, should be audibly reproduced by the endpoint device, operative to cause the endpoint device to emulate an active on-hold voice connection period between the server and endpoint device pending availability of the interactive session resource by at least reproducing the plurality of audible media segments in the specific sequence.

15. The system according to claim 14, wherein the executable application is configured to monitor user actions and report user availability data to the server based on the monitored user actions.

16. The system according to claim 15, wherein the program instructions further comprise collecting, over the data channel pending availability of the interactive session resource, current endpoint user availability for start of the interactive, real-time communication session when the interactive session resource becomes available.

17. The system according to claim 14, wherein the interactive session resource is a contact center agent, the program instructions further comprising pending availability of the interactive session resource, reserving a place in a queue for assignment to a next available contact center agent via an interactive real time connection to an endpoint terminal associated with the next available contact center agent.

18. The system according to claim 14, wherein the plurality of audible media segments includes at least one of one of music-on-hold, an estimate of wait time, marketing messages, or product information messages.

* * * * *